United States Patent
McNeeney et al.

(10) Patent No.: US 8,843,717 B2
(45) Date of Patent: *Sep. 23, 2014

(54) MAINTAINING CONSISTENCY OF STORAGE IN A MIRRORED VIRTUAL ENVIRONMENT

(71) Applicant: International Business Machines Corporation, Armonk, NY (US)

(72) Inventors: Adam J. McNeeney, Cambridge (GB); David James Oliver Rigby, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/781,610

(22) Filed: Feb. 28, 2013

(65) Prior Publication Data

US 2014/0082311 A1    Mar. 20, 2014

Related U.S. Application Data

(63) Continuation of application No. 13/238,253, filed on Sep. 21, 2011.

(51) Int. Cl.
| G06F 12/00 | (2006.01) |
| G06F 3/06 | (2006.01) |
| G06F 9/455 | (2006.01) |

(52) U.S. Cl.
CPC ............ *G06F 3/0667* (2013.01); *G06F 3/0619* (2013.01); *G06F 2009/4557* (2013.01); *G06F 9/45541* (2013.01); *G06F 3/067* (2013.01); *G06F 2009/45562* (2013.01)
USPC ........................................................ 711/162

(58) Field of Classification Search
None
See application file for complete search history.

(56) References Cited

U.S. PATENT DOCUMENTS

| 7,213,246 B1 | 5/2007 | van Rietschoete et al. |
| 8,458,517 B1 * | 6/2013 | Vermeulen et al. ............. 714/15 |
| 2007/0094659 A1 | 4/2007 | Singh et al. |
| 2008/0133688 A1 * | 6/2008 | Holt ............................. 709/212 |
| 2008/0155169 A1 | 6/2008 | Hiltgen et al. |
| 2008/0189468 A1 | 8/2008 | Schmidt et al. |
| 2008/0215701 A1 * | 9/2008 | Holt ............................. 709/213 |

OTHER PUBLICATIONS

Waldspurger, "Memory Resource Management in VMWARE ESX Server", © 2002 OSDI, p. 1-14.*

(Continued)

*Primary Examiner* — Brian Peugh
(74) *Attorney, Agent, or Firm* — Yudell Isidore Ng Russell PLLC; Matthew Talpis

(57) ABSTRACT

A method achieves data consistency in a shared storage accessible by a first and second machine. The method includes, in response to receiving state information of the first machine, configuring the second machine to a mirrored operating state corresponding to an operating state of the first machine, receiving a notification that the first machine will overwrite existing data stored in the shared storage, and, in response to the notification, reading the existing data, storing a copy of existing data in a local storage of the second machine, and sending an acknowledgment to the first machine that the copy has been stored in the local storage, to enable the first machine to overwrite the existing data with newly written data. The method also includes, in response to receiving a failure notification, retrieving the copy of the existing data, overwriting the newly written data with the copy of the existing data.

24 Claims, 6 Drawing Sheets

(56) References Cited

OTHER PUBLICATIONS

Du, Y. and Yu, H., "Paratus: Instantaneous Failover via Virtual Machine Replication," May 2009, Eighth International Conference on Grid and Cooperative Computing, IEEE.

Farr, E.M. et al., "A Case for High Availability in a Virtualized Environment (HAVEN)," Apr. 2008, Third International Conference on Availability, Reliability and Security, IEEE.

U.S. Appl. No. 13/238,253 entitled "Maintaining Consistency of Storage in a Mirrored Virtual Environment"; Non-final office action dated Oct. 16, 2013 (13 pg).

U.S. Appl. No. 13/238,253 entitled "Maintaining Consistency of Storage in a Mirrored Virtual Environment"; Notice of allowance dated Feb. 21, 2014 (5 pg).

\* cited by examiner

US 8,843,717 B2

MAINTAINING CONSISTENCY OF STORAGE IN A MIRRORED VIRTUAL ENVIRONMENT

PRIORITY CLAIM

The present application is a continuation of U.S. patent application Ser. No. 13/238,253, titled "Maintaining Consistency of Storage in a Mirrored Virtual Environment," filed on Sep. 21, 2011, the contents of which is incorporated herein by reference in its entirety.

BACKGROUND

1. Technical Field

The present invention generally relates to data processing systems and in particular to storage consistency in virtualized data processing systems.

2. Description of the Related Art

A virtual machine (VM) is a logical implementation of a physical machine, such as a data processing system, or a computer system. As such, a VM is capable of executing computer programs and computer readable code in the same way a physical computer system would execute the code, and the VM may use resources provided by the physical machine as the resources are made available to the VM. Said another way, the VM provides abstractions of physical resources that are made available to computer programs executing on the VM. A physical machine, such as a computer system, may include a single VM, or may include several VMs. The software layer providing the VM is called a hypervisor.

One method for implementing VMs includes using a mirrored VM environment. A mirrored VM environment includes two identical VMs. Each of the two identical VMs includes identical abstractions of available physical resources. Mirrored VMs may reside on a single host, or on separate hosts. The mirrored VM environment allows computer code that has encountered a hardware error on one virtual machine, to execute on a second virtual machine.

BRIEF SUMMARY

Aspects of the described embodiments provide a method for achieving data consistency in a shared storage accessible by a first machine and a second machine. The method comprises: in response to receiving first state information of the first machine from a first checkpoint performed on the first machine, configuring the second machine to a mirrored operating state corresponding to a first checkpoint operating state of the first machine. The method also includes: receiving a notification that the first machine will overwrite one or more existing data that is stored in the shared storage; and includes, in response to receiving the notification that the first machine will overwrite one or more existing data, reading the one or more existing data stored in the storage location, storing a copy of the one or more existing data in a local storage of the second machine, and sending an acknowledgment to the first machine that the existing data has been successfully stored in the local storage, to enable the first machine to overwrite the one or more existing data in the shared storage with newly written data. The method also provides, in response to receiving a failure notification indicating that the first machine has failed prior to a next checkpoint, retrieving the copy of the existing data from the local storage of the second machine, overwriting the newly written data in the shared storage with the copy of the existing data retrieved from the local storage of the second machine, and triggering the second machine to take over and resume work that was previously being performed from the first checkpoint by the first machine.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
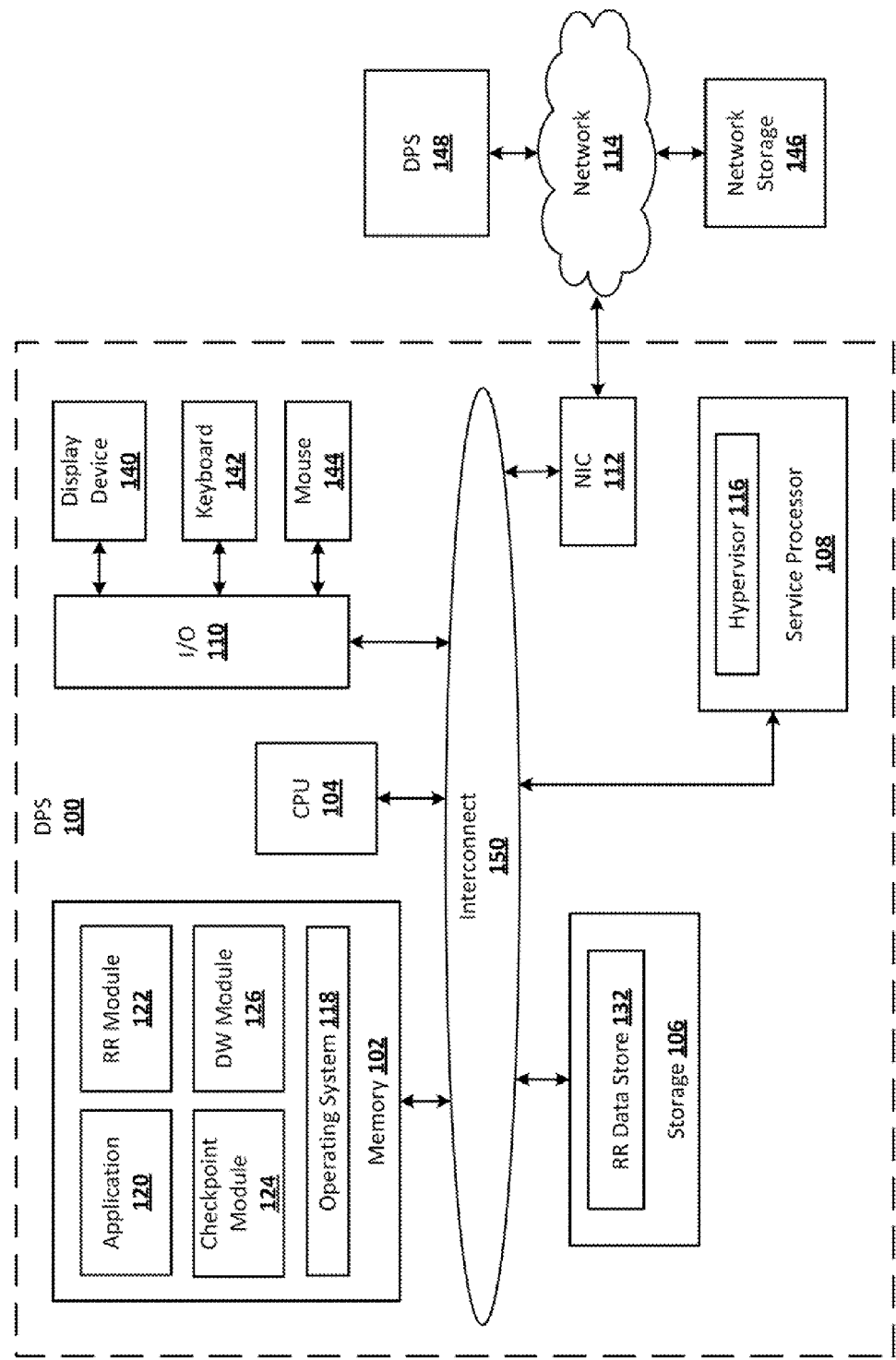
FIG. 1 provides a block diagram representation of an example data processing system within which the invention can be practiced, according to one embodiment.

The illustrative embodiments provide a method, system and computer program product for achieving data consistency in a shared storage by mirrored virtual machines. Briefly, while computer code executes on a first virtual machine, state information is periodically captured at checkpoints and forwarded to a second virtual machine. The state information is utilized to configure the secondary virtual machine to mirror the operating state of the primary virtual machine at that checkpoint. In response to receiving a notification that the first virtual machine will overwrite existing data in the shared storage device following a checkpoint, the secondary virtual machine reads the existing data from the shared storage, stores the existing data in a local storage for the secondary virtual machine, and sends an acknowledgment to the first virtual machine. Further, in one or more embodiments, the second virtual machine receives a notification indicating that the first virtual machine has failed prior to a next checkpoint. In response to receiving the notification, the second virtual machine retrieves the copy of the existing data from the local storage, overwrites the newly written data in the shared storage with the copy of the existing data, and triggers a processor of the second virtual machine to resume work that was previously being performed by the first machine. The second virtual machine resumes operation from the first checkpoint using the data values stored in the shared storage at the first checkpoint.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions (or code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a computer readable medium that can direct a computer, other programmable data processing apparatus, or other devices to function in a particular manner, such that the instructions stored in the computer readable medium produce an article of manufacture (or computer program product) including instructions which implement the method/process/function/act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

It is appreciated that the computing environment in which the described embodiments can be practice can be referred to as a cloud computing environment. Cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (e.g., a computer system) that executes instructions like a physical machine. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying physical machine resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

With reference now to the figures, and beginning with FIG. 1, there is depicted a block diagram representation of an example data processing system (DPS) 100, within which the functional aspects of the described embodiments may advantageously be implemented. DPS 100 includes numerous components logically connected by Interconnect 150. Specifically, FIG. 1 depicts DPS 100 including Memory 102, Central Processing Unit (CPU) 104 (also interchangeably referred to as a processor), Storage 106, Service Processor 108, Input/Output (I/O) controller 110, and network interface card (NIC) 112 (also interchangeably referred to as a network interface). In addition, FIG. 1 depicts that DPS 100 may be connected via NIC 112 to Network Shared Storage 146 and a second DPS 148 across Network 114.

Those skilled in the art will appreciate that CPU 104 can be any kind of hardware processor. I/O controller 110 allows a user to interface with DPS 100. As depicted, I/O controller 110 provides an interface for such devices as Display Device 140, Keyboard 142, and Mouse 144. According to one or more embodiments, Display Device 140 may include output means such as a liquid crystal display (LCD), a plasma display, a cathode ray tube (CRT) monitor, or any other kind of display device.

DPS 100 also includes Service Processor 108 that provides a processing engine to support the execution of Hypervisor 116 and the various virtualization services enabled by execution of Hypervisor 116. As described with reference to FIGS. 2-3, Hypervisor 116 provisions resources of DPS 100 to create one or more Operating System (OS) logical partitions or virtual machines and Hypervisor 116 manages the virtual machines and several of the administrative processes associated with the virtual machines.

Memory 102 may be random access memory (RAM), cache memory, flash memory, or any other kind of storage structure that is configured to store computer instructions/code executable by CPU 104 and/or data utilized during such execution. As depicted, Memory 102 includes Operating System 118. Operating System 118 may be any platform that manages the execution of computer code and manages hardware resources. For example, Operating System 118 may be the Advanced Interactive Executive (AIX®) operating system, the LINUX® operating system, or any other operating system known in the art. AIX® is a registered trademark of International Business Machines Corporation, and LINUX® is a registered trademark of Linus Torvalds.

Memory 102 also includes Application 120 and a plurality of functional modules, such as Rollback Read (RR) Module 122, Checkpoint Module 124, and Data Write (DW) Module 126. It is appreciated that one or more of these modules can be associated with Hypervisor 116 and/or can be distributed to specific memory of the one or more virtual machines that can be provisioned by Hypervisor 116. For purposes of clarity of this description, Application 120 is executable computer code which can be executed within mirrored virtual machines provisioned by Hypervisor 116. In one or more embodiments, Application 120 may be any computer code that is executable within a mirrored virtualization environment comprising a first virtual machine and a second virtual machine, which are mirrored virtual machines (see, for example, FIGS. 2 and 3). Within the mirrored virtualization environment, Application 120 is executed by one or more logical partitions (virtual machines) configured by abstracting one or more hardware, firmware and/or OS resources from the components of DPS 100, such as Memory 102, Storage 106, and CPU 104. The logical partitions of DPS 100, or any representation of DPS within the description of the various embodiments, will be interchangeably referred to as virtual machines.

As depicted, DPS 100 also includes Storage 106. Storage 106 may be any kind of computer storage device, such as a hard disk, an optical drive such as a compact disk drive or digital video disk (DVD) drive, and a flash memory drive. When DPS 100 includes a secondary virtual machine, Storage 106 can include RR Data Store 132, which includes one or more sets of data that has been overwritten in a shared storage from the time a checkpoint was performed by Checkpoint Module 124 in the first virtual machine. The operation of Checkpoint Module 124 within the processes for achieving data consistency provided herein is described in detail below with reference to FIGS. 2-6. In one or more embodiments, Rollback Read (RR) Data Store 132 includes an Rollback Read (RR) mapping that provides a mapping between each of the one or more sets of stored data and an associated storage location of the shared storage device, such as Network Storage 146, from which the data was read. RR Data Store 132 may also exist in Network Storage 146, or in a storage device within second DPS 148.

Figure 2:
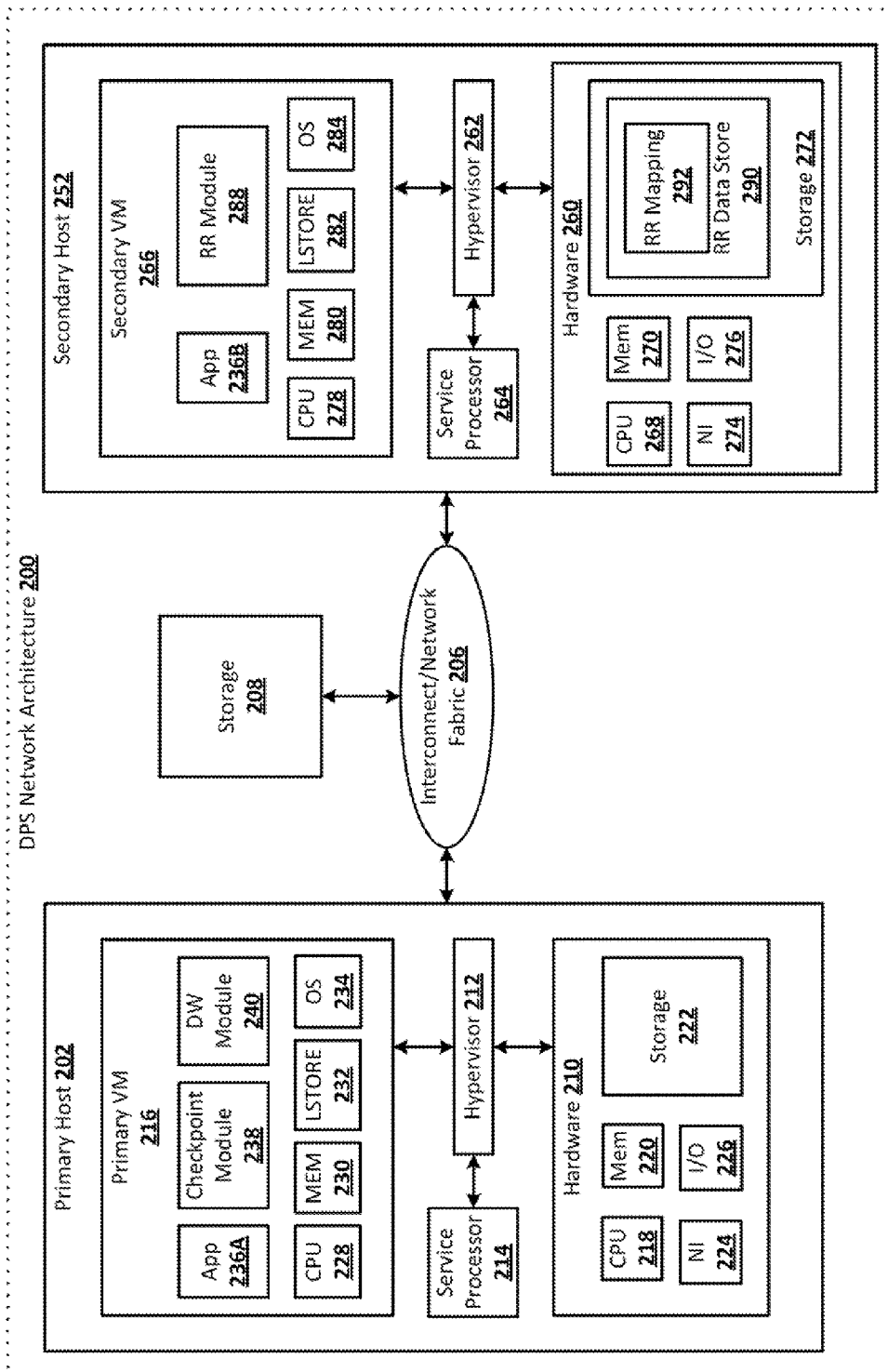
FIG. 2 provides a block diagram representation of an example computing environment with mirrored virtual machines connected within a network architecture, according to one embodiment.

With reference now to FIG. 2, there is illustrated an example virtualized Networked DPS Architecture 200 having mirrored virtual machines in separate host devices interconnected via a network architecture (206), according to one or more of the described embodiments. Networked DPS Architecture 200 serves as an example of the mirrored VM environment with the primary and secondary VMs located on different host devices distributed across a network.

As depicted, Networked DPS Architecture 200 includes Primary Host 202 and Secondary Host 252 communicatively connected across an interconnect or a Network Fabric 206. In addition, the Networked DPS Architecture 200 includes Storage 208 connected on the Network Fabric 206. According to one or more embodiments, each of the Primary Host 202 and Secondary Host 252 is a physical computer system. Similar to DPS 100 in FIG. 1, Primary Host 202 includes Hardware 210, including I/O 226, Network Interface (NI) 224, local Storage 222, CPU 218, and Memory 220. Similarly, Secondary Host 252 includes separate Hardware 260, including I/O 276, Network Interface (NI) 274, local Storage 272, CPU 268, and Memory 270. Components found in Hardware 210 and Hardware 260 can be similar to components found in DPS 100 of FIG. 1.

In Primary Host 202, Hypervisor 212 is logically located above Hardware layer 210. Hypervisor 212 is a virtualization management component that partitions resources available in Hardware 210 to create logical partitions, such as Primary VM 216. In addition, Hypervisor 212 is configured to manage Primary VM 216 and the system resources made available to Primary VM 216. Hypervisor 212 is operatively connected to Service Processor 214 (and/or may execute within/on service processor 214), which allows for external configuration and/or management of the logical partitions via Hypervisor 212.

As illustrated, Primary VM 216 includes CPU 228, which is a logical partition of CPU 218, and Memory 230, which is a logical partition of Memory 220. Primary VM 216 can also have access to logical partitions of Storage 222 that provides local storage 232 for Primary VM 216. In addition, Primary VM 216 includes an instance of Operating System 234. Although not shown, Operating System 234 can be an instance of an operating system located in Memory 220, according to one or more embodiments. Primary VM 216, and the logical components therein, provide a virtual execution environment for computer code. Specifically, as depicted, Primary VM 216 can be an execution environment for execution of Application 236A, Checkpoint Module 238, and DW Module 240. In an alternate embodiment, one or both of Checkpoint Module 238 and DW Module 240 can exist as executable modules within Hypervisor 212 and execution of Checkpoint Module 238 and DW Module 240 can be periodically triggered by Hypervisor 212. In yet another embodiment, one or both of Checkpoint Module 238 and DW Module 240 can be executable modules within OS 242.

Checkpoint Module 238 is a utility that captures state information corresponding to a point in execution where execution has been suspended. The state of Primary VM 202 when a checkpoint is encountered is a checkpoint operating state. In one or more embodiments, state information includes data such as a processor state, memory pages, and data in storage that have been modified since the previous checkpoint or since execution of Application 246 was initiated. Checkpoint Module 238 obtains state information for a checkpoint operating state of resources in Primary VM 202 when execution of Application 236A is suspended because a checkpoint is encountered. In one of more embodiments, checkpoints are points in execution of a computer program at which state information should be captured and a mirrored virtual machine should be configured to a mirrored operating state that matches the checkpoint operating state of Primary VM 202. Checkpoints may be provided by Application 236A. Alternatively, Checkpoint Module 238 may periodically generate checkpoints during execution of Application 236A. When a checkpoint is encountered, Checkpoint Module 238 causes execution of Application 236A to be suspended by CPU 228, the processor executing Application 236A. Checkpoint Module 248 transmits captured state information to a storage device, causes execution of Application 246A to restart from the point of execution where execution was suspended, and continues to monitor execution of Application 246A to identify when a next checkpoint has been encountered.

DW Module 240 is a utility that can run concurrently during execution of Application 236A to identify when Primary VM 216 is attempting to overwrite data in a shared storage device with Secondary VM 266. DW Module 240 uses a local storage device to provide a mirrored view of the shared storage between Primary VM 216 and Secondary VM 266. In one or more embodiments, when Application 236A attempts to overwrite data stored in a storage device shared with Secondary VM 266, DW Module 240 generates a notification to send to Secondary VM 266 that the first machine is about to overwrite existing data, and DW Module 240 passes the address of the location of data in the shared storage. DW Module 240 sends the notification to either Secondary VM 266 or Hypervisor 262 so that the current data in the identified storage location can be copied and stored locally to the Secondary VM 266. DW Module 240 waits to receive an acknowledgment that the data has been copied and stored in local storage of the Secondary VM 266 before allowing Application 236A executing on Primary VM 216 to overwrite the data in the identified shared storage location.

In Secondary Host 252, Hypervisor 262 is logically located above Hardware layer 260. Hypervisor 262 is a virtualization management component that partitions resources available in Hardware 260 to create logical partitions, such as Secondary VM 266. In addition, Hypervisor 262 is configured to manage Secondary VM 266 and the system resources made available to Secondary VM 266. Hypervisor 262 is operatively connected to Service Processor 264 (and/or may execute within/on service processor 264), which allows for external configuration and/or management of the logical partitions via Hypervisor 262.

Within the mirrored virtual environment of Networked DPS architecture 200, Hypervisors 212 and 262 communicate with each other during set up of the primary VM 216 and secondary VM 266 to ensure that the two mirrored VMs are similarly/identically configured from a hardware and software standpoint. From the overall system perspective, in one or more embodiments, each hypervisor allocates an exact amount of resources to its respective virtual machine and also ensures that the type of resource being allocated is similar. For example, the processor speeds of the allocated processor resources, and the type (i.e., speed of access and physical configuration) of read only memory and of random access memory provisioned are equivalent in Primary VM 216 and Secondary VM 266. A similar version of the OS instance is also allocated to each of the virtual machines. Similar loading of executable work is also provided for both systems, although only the Primary VM 216 actually executes its workload on an ongoing basis. Thus, both Primary VM 216 and Secondary VM 266 are provided with an identical copy of Application, identified as Application 236A and Application 236B, respectively. The Secondary VM 266 serves as a backup VM and specifically as a VM that operates primarily to perform execution of Application 246B in the event of a hardware failure that occurs at the primary VM 216. Thus, execution of computer code (of Application 246B, for example) at the Secondary VM 266 can be limited to only execution of computer code from a specific code execution point corresponding to a checkpoint before which execution of the computer code was successful in Primary VM 216.

In order to efficiently failover to Secondary VM 266 in the event of an execution failure of the computer code of Primary VM 216, one embodiment provides that Secondary VM 266 is automatically configured to the current operating state of the primary VM 216 at each checkpoint. Thus, Hypervisor 262 receives/obtains the state information from Primary VM 216 at a first checkpoint, and Hypervisor 262 immediately configures Secondary VM 266 to a mirrored operating corresponding to the checkpoint operating state of the Primary VM 216. In one or more embodiments, the configuration of resources of Secondary VM 266 results in the state of CPU 278, Memory 280, and Local Storage 282 matching the state of CPU 228, Memory 230, and Local Storage 232, respectively. In addition, configuration of Secondary VM 266 achieves a consistent view of any physical storage shared by Primary VM 216 and Secondary VM 266 as of that checkpoint. For example, Primary VM 216 and Secondary VM 266 may each have access to Storage 222, Storage 272, or Storage 208 over the network. Once the configuration of Secondary VM 266 as a mirrored virtual machine to Primary VM 216 successfully completes, Hypervisor 262 notifies Hypervisor 212, and Hypervisor 212 initiates the resumption of code execution on Primary VM 216.

Secondary VM 266 includes CPU 278, which is a logical partition of CPU 268, and Memory 280, which is a logical partition of Memory 270. Secondary VM 226 can also have access to logical partitions of Storage 254 that provides local storage 272 for Secondary VM 226. In addition, Secondary VM 216 includes an instance of Operating System 266. Primary VM 216 and Secondary VM 226 are mirrored virtual machines. Thus, Secondary VM 226, and the logical components therein, provide a virtual execution environment for computer code that is equivalent to the virtual execution environment of Primary VM 216. As depicted, Secondary VM 226 can be an execution environment to execute Application 246B, and RR Module 288. In an alternate embodiment, RR Module 268 may be provided as part of Hypervisor 262 and can exist as an executable module within Hypervisor 262, and execution of RR Module 288 can be triggered by Hypervisor 262 following receipt of notification of a failure condition detected in the execution of the computer code (e.g., Application 246A) on Primary VM 216. In yet another embodiment, RR Module 288 can be an executable module within OS 284.

In an alternate embodiment, RR Module 288 can be provided as a service within service processor 264 operating in conjunction with Hypervisor 262.

RR Module 288 is a utility that interfaces with DW Module 240, and receives notifications that the first machine will overwrite one or more existing data that is stored in a shared storage of Primary VM 216 and Secondary VM 266. DW Module 240 reads existing data currently stored in the storage location, and stores a copy of the existing data in a local store, such as RR Data Store 290. In one or more embodiments, a mapping between the existing data and the storage location from which the data was read is stored in RR Mapping 292. After the copy of the existing data is stored, the RR Module 288 sends an acknowledgment to Primary VM 216 indicating that the existing data was successfully stored. In one or more embodiments, the acknowledgment may be sent to DW Module 240 or Hypervisor 212 to allow Primary VM 216 to overwrite the existing data.

RR Module 288 also interfaces with Checkpoint Module 238. When Checkpoint Module 238 sends state information to the Hypervisor 262 and causes Hypervisor 262 to reconfigure Secondary VM 266, RR Module 288 removes previously copied data from RR Data Store 290. In addition, if an execution failure occurs by the Primary VM 216 during execution of Application 246A, RR Module 288 receives a notification that an execution failure has occurred. RR Module 288 retrieves data stored in RR Data Store 290 and identifies the location(s) in storage from which the data was read by using RR Mapping 292. RR Module 288 overwrites the newly written data in the storage locations identified by RR Mapping 292 with the retrieved data that was previously copied and stored in RR Data Store 290. Thus, following the failover to Secondary VM 266, the view of the shared storage device by Secondary VM 266 is identical to the view of the shared storage device by Primary VM 216 at the previous checkpoint. In one or more embodiments, after the operating state of Secondary VM 266 is configured to match the operating state of Primary VM 216 at the previous checkpoint, RR Module 288 or Hypervisor 262 triggers CPU 278 to resume work that was previously being performed by Primary VM 216 from the previous checkpoint.

Figure 3:
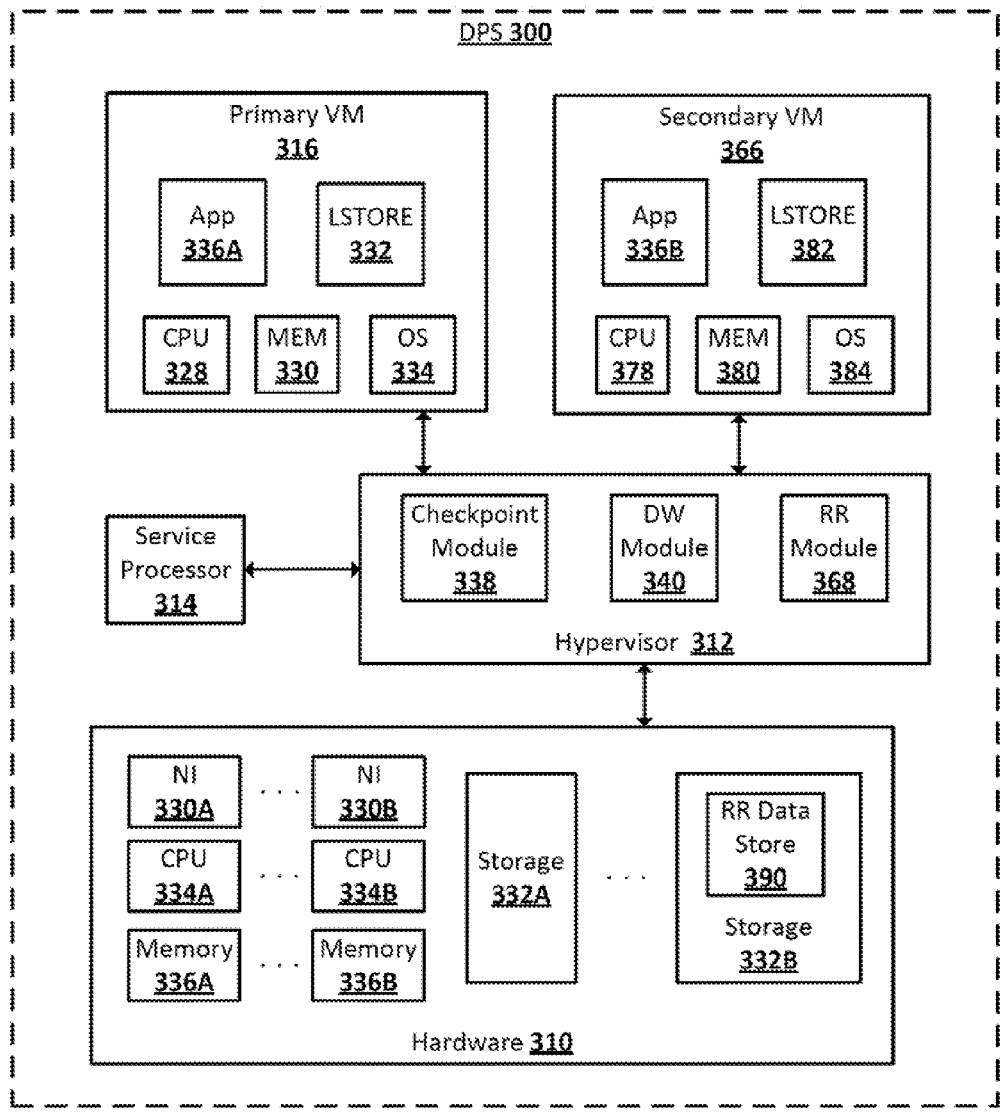
FIG. 3 provides a block diagram representation of an example computing environment having mirrored virtual machines collocated on the same physical host, according to one embodiment.

With reference now to FIG. 3, there is presented a single host device implementation of an example virtualized DPS architecture 300, within which the functional aspects of the described embodiments may advantageously be implemented. Virtualized DPS 300 serves as an example of a mirrored VM environment within a single physical device. Virtualized DPS 300 is presented as a server that comprises hardware components 310 and software, firmware, and/or OS components that are logically partitioned and provisioned by a hypervisor 312 to create Primary VM 316 and Secondary VM 366.

The architecture of DPS 300 is similar to that of FIG. 1 with the virtualized machines individually illustrated. Within this alternate embodiment, the Hardware layer 308 includes a plurality of each of CPU 334A-334B, Storage 332A-332B, Memory 336A-336B, and network adapters or interfaces (NI) 330A-330B. Hypervisor 312 and Service Processor 314 are logically located above Hardware layer 310. As shown, FIG. 3 exemplifies one or more embodiments where Checkpoint Module 338, DW Module 340, and RR Module 368 are located within Hypervisor 312. As with FIG. 2, Hypervisor 312 partitions resources available in Hardware 310 to create logical partitions, including both Primary VM 316 and Secondary VM 366, which are collocated on the same physical device (e.g., DPS 300). In addition, Hypervisor 312 is configured to manage both Primary VM 316 and Secondary VM 366 and the system resources made available to Primary VM 316 and Secondary VM 366. Hypervisor 312 further supports all communication between Primary VM 316 and Secondary VM 366, particularly the exchange of information related to checkpoint operations and consistency of shared data storage, as presented herein.

Although Primary VM 316 and Secondary VM 366 reside in a single physical device, the specific ones of the physical resources allocated to each VM may differ. For example, in Primary VM 316, CPU 328, Memory 330, and Local Storage 332, may be logical partitions of CPU 334A, Memory 336A, and Storage 332A, respectively. In addition, in Secondary VM 366, CPU 378, Memory 380, and Local Storage 382, may be logical partitions of CPU 334B, Memory 336B, and Storage 332B, respectively. Further, each of Primary VM 316 and Secondary VM 366 include an instance of an operating system (OS 334 and OS 384). In one or more embodiments, RR Data Store 390 can be located in Storage 332B. As with FIG. 2, both Primary VM 316 and Secondary VM 366 are configured as similar/identical virtual machines, referred to herein as mirrored virtual machines.

Figure 4:
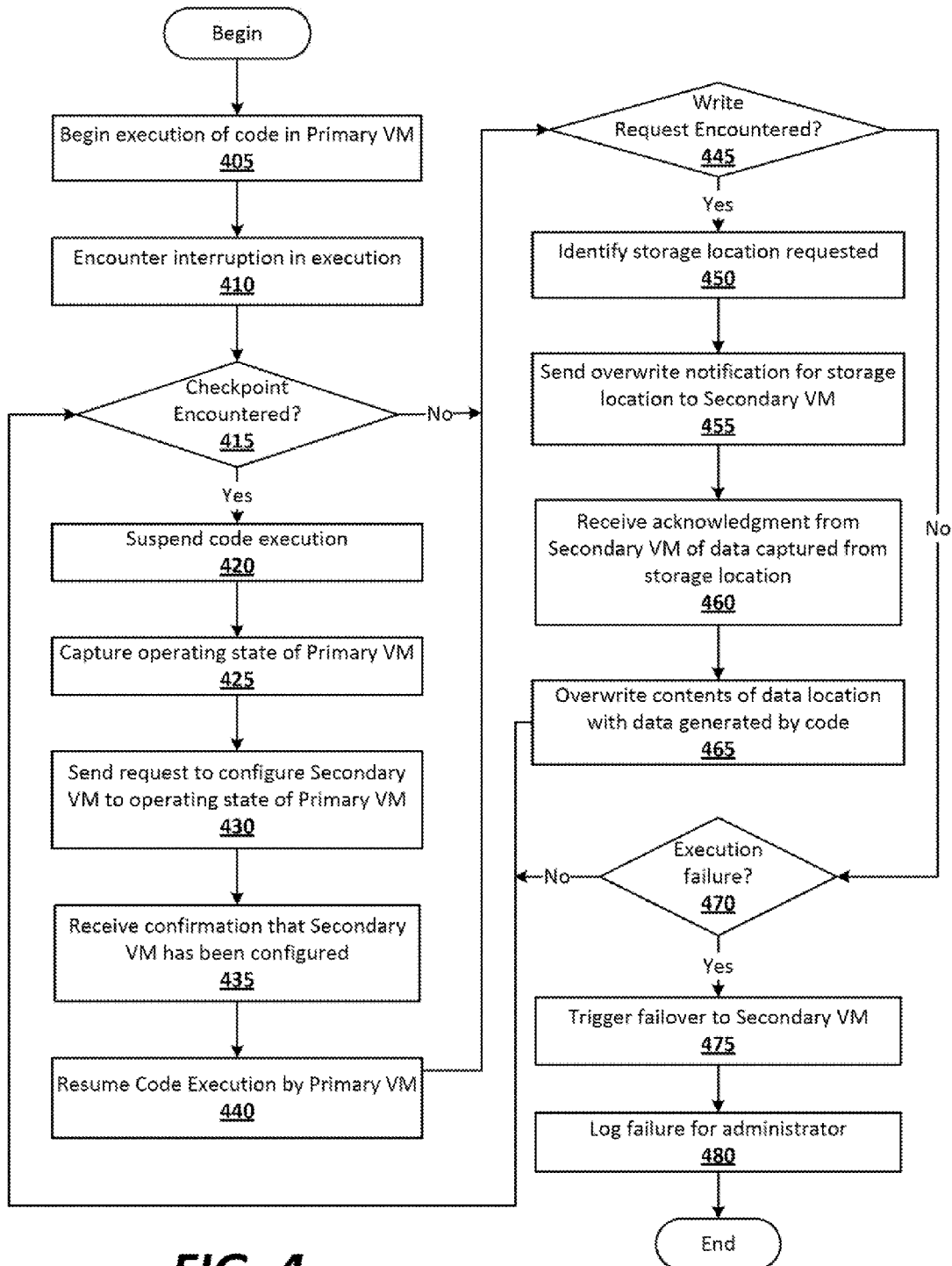
FIG. 4 is a flow chart illustrating the method for achieving data consistency by collecting state information using checkpoint operations and notifying of a failure occurring during execution of a computer code on a first virtual machine, according to one embodiment.

Those of ordinary skill in the art will appreciate that the hardware components and basic configuration depicted in FIGS. 1-3 may vary. The illustrative components within DPS are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing systems depicted in FIGS. 1-3 may be, for example, an IBM eServer pSeries system, a product of International Business Machines Corporation in Armonk, N.Y., running the AIX operating system or LINUX operating system FIG. 4 illustrates a flow chart illustrating a computer-implemented method for achieving data consistency by capturing and storing state information, according to one embodiment. Specifically, FIG. 4 illustrates a method for capturing, on a first machine, state information that can be utilized for configuring a second machine within a mirrored virtual environment having a primary and a secondary virtual machine. As described above, the primary and secondary virtual machine may be located on separate physical devices, or they may be located on a single device, and references are made to components presented within both the FIGS. 2 and 3 architecture. One or more processes within the method can be completed by the CPU 228/328 of a primary VM 216/316 executing Checkpoint Module 238/338 or alternatively by service processor 214/314 executing Checkpoint Module 238/338 as a code segment of hypervisor 212/312 and/or the OS 234/334. To ensure coverage for these alternate embodiments, the method will be described from the perspective of the Checkpoint Module 238/338 and DW Module 240/340 and the functional processes completed by the Checkpoint Module 238/338 and DW Module 240/340, without limiting the scope of the invention.

The method begins at block 405, where the primary virtual machine begins execution of computer code, such as executable code for an application. For simplicity, the following description assumes that the execution of the computer code occurs after the set up and configuration of the mirrored virtual machines. Execution of the computer code continues, on the Primary VM, until an interruption in the code execution is encountered at block 410. At decision block 415, the checkpoint module determines whether a checkpoint has been encountered. In this scenario, the checkpoint can be one that is pre-programmed within the instruction code to occur at specific points in the code's execution. In one or more alternate embodiments, the checkpoint can be triggered by the checkpoint module to cause the hypervisor to pause the processor execution within the primary virtual machine at a specific time (based on some pre-set periodicity). Rather than encountering a checkpoint, the checkpoint module can thus be said to generate the checkpoint. In one or more embodiments, a checkpoint is generated when the data stored in the shared storage exceeds a threshold amount of data.

If, at block 415, a checkpoint is encountered, then the method continues at block 420, and the checkpoint module causes the hypervisor to suspend execution of the computer code in the primary virtual machine. Then, at block 425, the checkpoint module captures current state information. In one or more embodiments, the checkpoint module captures current state information corresponding to work performed by the primary virtual machine just prior to the first checkpoint. At block 430, the checkpoint module transmits the state information to a hypervisor, and the hypervisor configures a mirrored secondary virtual machine using the state information. As described above, state information may include such data as a processor state, the state of memory pages, the state of storage devices, the state of peripheral hardware, or any other data regarding the state of any of the primary hardware, at an execution point in the computer code at which the checkpoint occurs in the primary virtual machine. In response to receiving a confirmation at block 435 that the Secondary VM has been configured, the method continues at block 440, and the checkpoint module causes the hypervisor to resume execution of the computer code in the primary virtual machine.

Returning to decision block 415, if the interruption encountered is not a checkpoint, then the method continues at decision block 445. In the scenario where a write request is encountered at block 445, the method continues at block 450. When a write request is encountered during execution of the computer code, the DW Module identifies the storage location in the shared storage at which the computer code is requesting to write. At block 455, the DW Module sends a notification to the secondary VM, or hypervisor for the secondary VM, that the primary VM will overwrite data currently stored in the storage location of the shared storage. In one or more embodiments, the overwrite notification includes a storage location in the shared storage at which the primary VM will overwrite data. In one or more embodiments, the DW Module waits to receive an acknowledgment from the secondary VM or hypervisor at block 460 indicating that the existing data in the storage location has been copied before the method continues. At block 465, the DW Module allows the computer code to overwrite the existing data in the storage location. The method continues at block 440 and code execution is resumed until the computer code encounters another write request during execution at block 445.

Returning to decision block 415, in the scenario where execution is interrupted, and the interruption is not a checkpoint or a write request, then an execution failure has occurred, as indicated block 470. The method continues at block 475, where the execution failure in the primary virtual machine causes the primary virtual machine to trigger a failover to the secondary virtual machine. According to one or more embodiments of the invention, the failover trigger may be in the form of a message passed from the primary virtual machine to the RR module, or any indication received by the RR module indicating that an execution failure has occurred in the primary virtual machine. At block 480, the execution failure is logged for an administrator.

Figure 5:
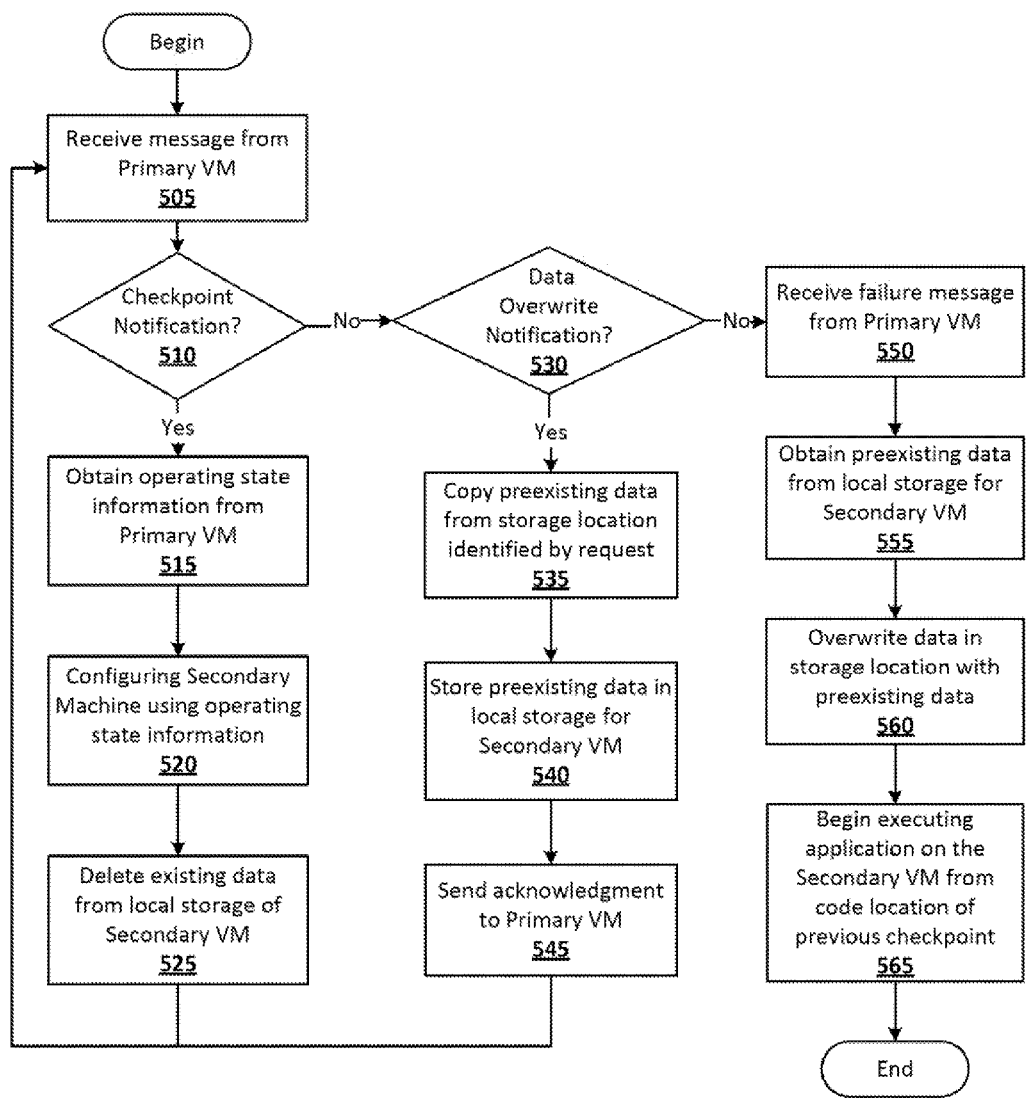
FIG. 5 is a flow chart illustrating the method for achieving data consistency by checkpoint-based configuration of mirrored virtual machines, according to one embodiment.

FIG. 5 illustrates a flow chart illustrating the process of achieving a consistent view of a shared storage device in the secondary virtual machine in relation to a first virtual machine in a mirrored virtual environment, according to one embodiment. Aspects of the method are described from the perspective of the secondary virtual machine, and particularly components within the secondary virtual machine. One or more processes within the method can be completed by the CPU 278/378 of a secondary VM 266/366 that is executing RR Module 288/388 or alternatively by service processor 264/314 executing RR Module 288/388 as a module within Hypervisor 262/312 and/or within the OS 284/384. To ensure coverage for these alternate embodiments, the method will be described from the perspective of RR Module 288/388 and the functional processes completed by RR Module 288/388, without limiting the scope of the invention.

The method begins at block 505, where the RR Module receives a message or notification from the primary virtual machine via the hypervisor(s). At block 510, a determination is made whether the notification received is a checkpoint. In the scenario where the notification received is a checkpoint notification, the method continues at block 515, and the RR Module obtains operating state information from the primary virtual machine. In one or more embodiments, operating state information includes a CPU state, as well as a current state of memory and storage. At block 520, the RR Module configures the secondary virtual machine using the state information. By configuring the secondary virtual machine, the operating state of the secondary virtual machine, including the state of the CPU, memory, and storage, is identical to the operating state of the primary virtual machine at the time the most recent checkpoint was processed. The method continues at block 525, and the RR Module removes any existing data from the RR data store in local storage for the secondary virtual machine. Those skilled in the art will appreciate that when the secondary virtual machine is configured to match the operating state of the first virtual machine at the latest checkpoint, it is no longer necessary to track any changes in data stored in the shared storage between checkpoints. The method continues at block 505, until another message is received from the primary virtual machine.

Returning to decision block 510, if the message received is not a checkpoint notification, then the method continues at decision block 530, and a determination is made whether the message is an overwrite notification. In the event that the received message is an overwrite notification, the method continues at block 535, and the RR Module copies preexisting data from a storage location identified by the overwrite notification. At block 540, the copied existing data is stored in local storage for the secondary virtual machine, such as the RR data store. When the local storage of the existing data is completed, the method continues at block 545 and the RR Module sends an acknowledgment to the primary virtual machine indicating that the preexisting data has been stored successfully. The method continues at block 505, until another message is received from the primary virtual machine.

Returning to decision block 510, if the message received is not a checkpoint notification, and at decision block 530, the message is not an overwrite notification, then the method continues at block 550, and it is determined that a failure message is received from the primary virtual machine. At block 555, the RR Module obtains preexisting data that has been stored in local storage since the last checkpoint. Those skilled in the art will appreciate that the locally stored preexisting data in the shared storage consists of data that has been overwritten by the primary virtual machine since the last checkpoint was processed. At block 560, the RR Module overwrites current data in the shared storage with the locally stored preexisting data. In one or more embodiments of the invention, the RR Module uses an RR Mapping to identify the location from which the preexisting data was copied. At 565, the secondary virtual machine begins executing the application from the code location of the previous checkpoint. Said another way, the second machine takes over and resumes work that was previously being performed by the primary virtual machine from the last checkpoint.

In each of the flow charts above, one or more of the methods may be embodied in a computer readable storage medium containing computer readable code such that a series of actions are performed when the computer readable code is executed by a processor on a computing device. In some implementations, certain actions of the methods are combined, performed simultaneously or in a different order, or perhaps omitted, without deviating from the spirit and scope of the invention. Thus, while the methods are described and illustrated in a particular sequence, use of a specific sequence of actions is not meant to imply any limitations on the invention. Changes may be made with regards to the sequence of actions without departing from the spirit or scope of the present invention. Use of a particular sequence is therefore, not to be taken in a limiting sense, and the scope of the present invention is defined only by the appended claims.

Figure 6:
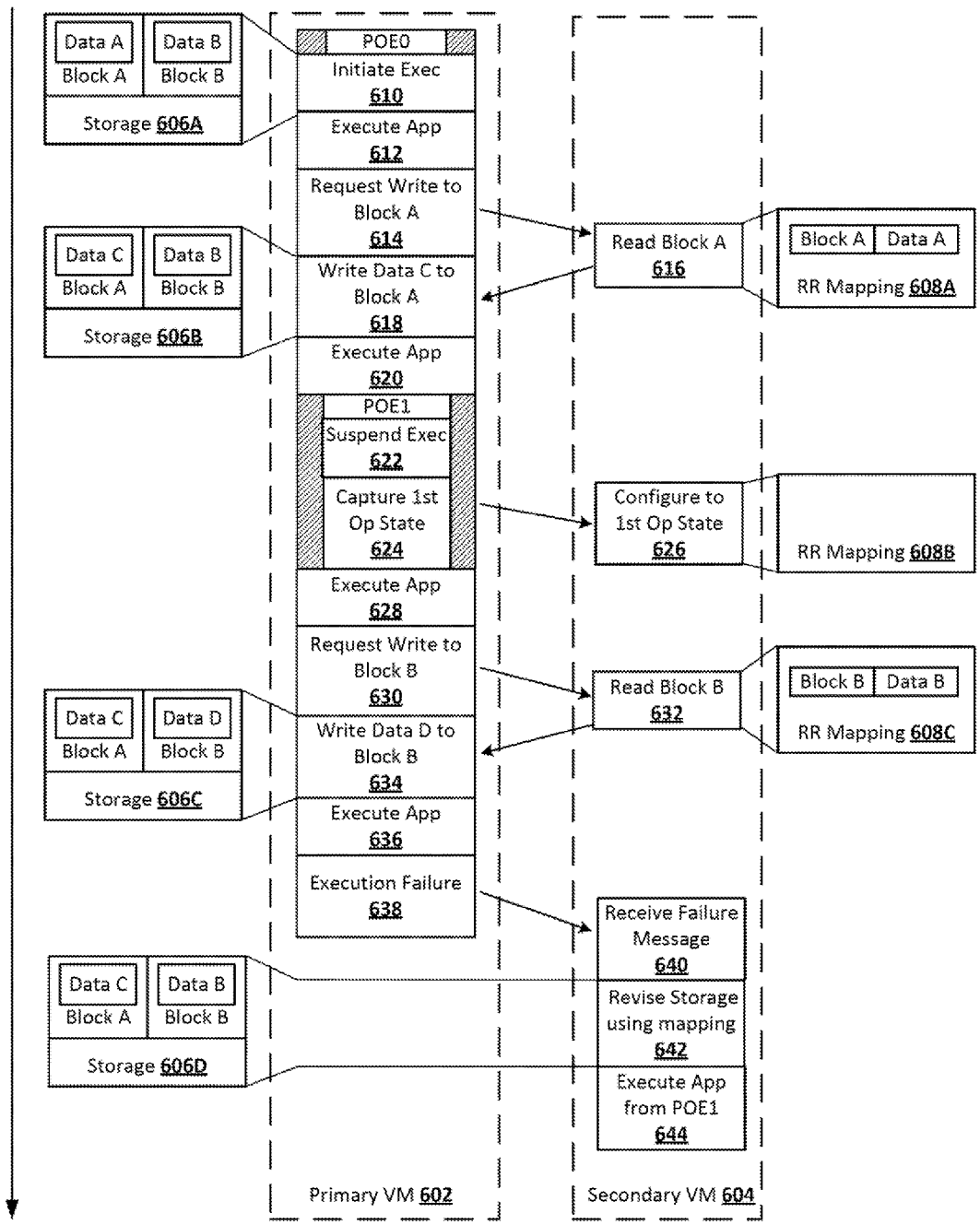
FIG. 6 is an example sequence diagram of the method for achieving data consistency in a shared storage by a mirrored virtual machine environment, according to one embodiment.

FIG. 6 illustrates an example flow diagram according to one or more embodiments. Specifically, FIG. 6 shows the execution state of Primary Virtual Machine 602 and Secondary Virtual Machine 604, along with shared storage 606A-606D, and RR Mapping 608A-608C at different times along a sequential vertical timeline. Those skilled in the art will appreciate that FIG. 6 is provided for exemplary purposes only and is not intended to be construed as limiting the scope of the described embodiments.

The flow diagram begins at 610, where processor execution of computer code of a computer program is initiated at/in Primary Virtual Machine 602. For purposes of this example, shared storage 606A is shown, at the time that execution of computer code is initiated, as consisting of data located in two data blocks: Data A in Block A and Data B in Bock B. Primary Virtual Machine 602 continues to execute the computer program at 612 until a request to write data is encountered at 614, identifying that Primary VM 602 will overwrite data in Block A. An overwrite notification is then sent to Secondary VM 604 indicating that Primary VM 602 will overwrite existing data in Block A (e.g., DataA). At 616, Secondary VM 604 copies and stores current data in Block A and stores the data and storage location (e.g., Block A) in RR Mapping 608A. Thus, at 608A, RR Mapping includes a connection between Block A and Data A. Then, an acknowledgment is sent to Primary VM 602, and at 618, Primary VM 602 is able to overwrite Data A in Block A with Data C, as shown by Storage 606B. Primary VM 602 continues to execute the application.

At 622, also denoted by POE (point of execution) 1, execution of the application is suspended by Primary VM 622, as a checkpoint has been encountered. At 624, Primary VM 602 captures first operating state, and state information, and sends the state information to Secondary VM 604. At 626, Secondary VM 604 is configured to match the first operating state captured at 624. In addition, any data stored in RR mapping is deleted, such the Data A-Block A mapping, as shown by RR Mapping 608B. The data stored in RR mapping is cleared because after Secondary VM 604 is configured, Secondary VM 604 has a consistent view of the shared storage. Said another way, after Secondary VM 604 has been configured, Primary VM 602 and Secondary VM 604 each have a view of the shared storage as depicted by Storage 606B. After Secondary VM 604 is configured to the checkpoint operating state, execution of the application can resume on Primary VM 602 at 628. Execution of the application resumes until a write request is encountered at 630. The request indicates that Primary VM 602 will overwrite data located in Block B. An overwrite notification is sent to Secondary VM 604, and Secondary VM 604 reads the existing data in Block B (Data B) and stores Data B as associated with Block B in RR Mapping, as depicted by RR Mapping 608C. Then, an acknowledgment is sent to Primary VM 602, and at 634, Primary VM 602 is able to overwrite Data B in Block B with Data D, as shown by Storage 606C. Primary VM 602 continues to execute the application at 636.

Execution of the application on Primary VM 602 continues at 636 until an execution failure is encountered at 638. The execution failure at 638 causes Secondary VM 604 to receive a failure message at 640. At 624, Secondary VM 604 overwrites the shared storage using the RR mapping to overwrite newly written data with preexisting data such that the shared storage appears as it did at the last checkpoint encountered by Primary VM 602 (e.g., POE1). Thus, Block B is overwritten with Data B, as identified in RR Mapping 608C. This results in Block A including Data C and Block B including Data B stored therein, as depicted by Storage 606D. It is important to note that overwriting the new data with the data from the RR mapping results in Storage 606D being identical to the shared storage at the time the last checkpoint was encountered, or Storage 606B. Then at 644, secondary VM 604 can resume executing the application from POE1, where the last checkpoint occurred.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code (or instructions) embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of achieving data consistency in a shared storage accessible by a first machine and a second machine, the method comprising:
   receiving a notification that the first machine will overwrite existing data that is stored in the shared storage, wherein the notification is received following a first checkpoint at the first machine, and wherein the first machine and the second machine are configured to perform work that modifies data in the shared storage;
   in response to receiving the notification that the first machine will overwrite the existing data that is stored in the shared storage:
      storing a copy of the existing data in a local storage of the second machine; and
      sending an acknowledgment to the first machine that the copy of the existing data has been successfully stored in the local storage, to trigger the first machine to proceed with overwriting the existing data in the shared storage with new data; and
   in response to detecting that a failure has occurred in the first machine prior to a next checkpoint:
      retrieving the copy of the existing data from the local storage of the second machine,
      overwriting the new data in the shared storage with the copy of the existing data retrieved from the local storage of the second machine, and
      triggering, by a hypervisor, a processor of the second machine to take over and resume work that was previously being performed by the first machine at the first checkpoint.

2. The method of claim 1, further comprising, in response to receiving a second notification of a second checkpoint at the first machine:
   receiving second state information corresponding to a second checkpoint operating state of the first machine;
   configuring the second machine to a mirrored operating state to the second checkpoint operating state of the first machine; and
   deleting the copy of the existing data from the local storage of the second machine.

3. The method of claim 1, wherein:
   the first machine and the second machine are a first virtual machine and a second virtual machine, each respectively configured and maintained by the hypervisor,
      wherein the first virtual machine comprises a first provisioning of a first processor and a first memory, and wherein the second virtual machine comprises a second provisioning of a second processor and a second memory,
      wherein the first virtual machine and the second virtual machine are configured to respectively perform a substantially identical execution of the work;
   the first virtual machine and second virtual machine are mirrored virtual machines in a mirrored virtualized architecture, whereby the second virtual machine serves as a backup machine to the first virtual machine in the event of failure of the first virtual machine; and
   the method further comprises:
      receiving first state information indicating the first checkpoint operating state of the first machine, wherein a processor of the first machine is performing work just prior to the first checkpoint;
      in response to receiving the first state information, configuring, by a hypervisor, the second machine to a mirrored operating state corresponding to the first checkpoint operating state of the first machine.

4. The method of claim 3, wherein the first virtual machine and the second virtual machine are collocated on a same physical host device and are configured and maintained by a same hypervisor.

5. The method of claim 1, wherein storing the copy of the existing data in the local storage of the second machine comprises:
   reading a complete block of data for the existing data that is to be overwritten, wherein the complete block of data is a smallest complete block of writeable storage, and storing the complete block of data for the existing data that is to be overwritten.

6. The method of claim 5, wherein the complete block of data is equivalent to a memory page of data.

7. The method of claim 1, wherein the next checkpoint is triggered when a size of the existing data is greater than a threshold amount of data.

8. The method of claim 1, wherein overwriting the new data in the shared storage with the copy of the existing data retrieved from the local storage of the second machine causes the view of the shared storage by the second machine to be identical to the view of the shared storage by the first machine at a first checkpoint preceding the overwriting of the new data.

9. A computer readable storage medium comprising computer readable code achieving storage consistency in a shared storage accessible by a first machine and a second machine, the code, when executed by a processor, causes the processor to:

receive a notification that the first machine will overwrite existing data that is stored in the shared storage, wherein the notification is received following a first checkpoint at the first machine, and wherein the first machine and the second machine are configured to perform work that modifies data in the shared storage; and in response to receiving the notification that the first machine will overwrite the existing data that is stored in the shared storage:

store a copy of the existing data in a local storage of the second machine; and send an acknowledgment to the first machine that the copy of the existing data has been successfully stored in the local storage, to trigger the first machine to proceed with overwriting the existing data in the shared storage with new data;

in response to detecting that a failure has occurred in the first machine prior to a next checkpoint:

retrieve the copy of the existing data from the local storage of the second machine, overwrite the new data in the shared storage with the copy of the existing data retrieved from the local storage of the second machine, and trigger, by the hypervisor, a processor of the second machine to take over and resume work that was previously being performed by the first machine at the first checkpoint.

10. The computer readable storage medium of claim 9, wherein the code further causes the processor to:

receive second state information corresponding to a second checkpoint operating state of the first machine;

configure the second machine to a mirrored operating state to the second checkpoint operating state of the first machine; and delete the copy of the existing data from the local storage of the second machine.

11. The computer readable storage medium of claim 9, wherein:

the first machine and the second machine are a first virtual machine and a second virtual machine, each respectively configured and maintained by a hypervisor, wherein the first virtual machine comprises a first provisioning of a first processor and a first memory, and wherein the second virtual machine comprises a second provisioning of a second processor and a second memory, wherein the first virtual machine and the second virtual machine are configured to respectively perform a substantially identical execution of the work;

the first virtual machine and second virtual machine are mirrored virtual machines in a mirrored virtualized architecture, whereby the second virtual machine serves as a backup machine to the first virtual machine in the event of failure of the first virtual machine; and the code further causes the processor to:

receive first state information indicating the first checkpoint operating state of the first machine, wherein a processor of the first machine is performing work just prior to the first checkpoint;

in response to receiving the first state information, configure, by a hypervisor, the second machine to a mirrored operating state corresponding to the first checkpoint operating state of the first machine.

12. The computer readable storage medium of claim 11, wherein the first virtual machine and the second virtual machine are collocated on a same physical host device and are configured and maintained by a same hypervisor.

13. The computer readable storage medium of claim 9, wherein storing the copy of the existing data in the local storage of the second machine comprises:

reading a complete block of data for the existing data that is to be overwritten, wherein the complete block of data is a smallest complete block of writeable storage, and storing the complete block of data for the existing data that is to be overwritten.

14. The computer readable storage medium of claim 13, wherein the complete block of data is equivalent to a memory page of data.

15. The computer readable storage medium of claim 9, wherein the next checkpoint is triggered when a size of the existing data is greater than a threshold amount of data.

16. The computer readable storage medium of claim 9, wherein overwriting the new data in the shared storage with the copy of the existing data retrieved from the local storage of the second machine causes the view of the shared storage by the second machine to be identical to the view of the shared storage by the first machine at a first checkpoint preceding the overwriting of the new data.

17. A system for of achieving data consistency in a shared storage accessible by a first machine and a second machine, the system comprising:

a computer processor; and a rollback read module which, when executed by the computer processor, causes the computer processor to:

receive a notification that the first machine will overwrite existing data that is stored in the shared storage, wherein the notification is received following a first checkpoint at the first machine, and wherein the first machine and the second machine are configured to perform work that modifies data in the shared storage; and in response to receiving the notification that the first machine will overwrite the existing data that is stored in the shared storage:

store a copy of the existing data in a local storage of the second machine; and send an acknowledgment to the first machine that the copy of the existing data has been successfully stored in the local storage, to trigger the first machine to proceed with overwriting the existing data in the shared storage with new data;

in response to detecting that a failure has occurred in the first machine prior to a next checkpoint:

retrieve the copy of the existing data from the local storage of the second machine, overwrite the new data in the shared storage with the copy of the existing data retrieved from the local storage of the second machine, and trigger, by the hypervisor, a processor of the second machine to take over and resume work that was previously being performed by the first machine at the first checkpoint.

18. The system of claim 17, the rollback read module further causing the computer processor to, in response to receiving a second notification of a second checkpoint at the first machine:

receive second state information corresponding to a second checkpoint operating state of the first machine;

configure the second machine to a mirrored operating state to the second checkpoint operating state of the first machine; and delete the copy of the existing data from the local storage of the second machine.

19. The system of claim 17, wherein:

the first machine and the second machine are a first virtual machine and a second virtual machine, each respectively configured and maintained by a hypervisor, wherein the first virtual machine comprises a first provisioning of a first processor and a first memory, and wherein the second virtual machine comprises a second provisioning of a second processor and a second memory, wherein the first virtual machine and the second virtual machine are configured to respectively perform a substantially identical execution of the work;

the first virtual machine and second virtual machine are mirrored virtual machines in a mirrored virtualized architecture, whereby the second virtual machine serves as a backup machine to the first virtual machine in the event of failure of the first virtual machine; and the code further causes the processor to:

receive first state information indicating the first checkpoint operating state of the first machine, wherein a processor of the first machine is performing work just prior to the first checkpoint;

in response to receiving the first state information, configure, by a hypervisor, the second machine to a mirrored operating state corresponding to the first checkpoint operating state of the first machine.

20. The system of claim 19, wherein the first virtual machine and the second virtual machine are collocated on a same physical host device and are configured and maintained by a same hypervisor.

21. The system of claim 17, wherein storing the copy of the existing data in the local storage of the second machine comprises:

reading a complete block of data for the existing data that is to be overwritten, wherein the complete block of data is a smallest complete block of writeable storage, and storing the complete block of data for the existing data that is to be overwritten.

22. The system of claim 21, wherein the complete block of data is equivalent to a memory page of data.

23. The system of claim 17, wherein the next checkpoint is triggered when a size of the existing data is greater than a threshold amount of data.

24. The system of claim 17, wherein overwriting the new data in the shared storage with the copy of the existing data retrieved from the local storage of the second machine causes the view of the shared storage by the second machine to be identical to the view of the shared storage by the first machine at a first checkpoint preceding the overwriting of the new data.

* * * * *